US005277398A

United States Patent [19]

Cahanciuc et al.

[11] Patent Number: 5,277,398

[45] Date of Patent: Jan. 11, 1994

[54] SOLENOID VALVE

[75] Inventors: Victor Cahanciuc, Villingen; Wolf-Dieter Goedecke, Unterkirnach; Thomas Kieninger, Georgen; Jörg Niederstadt, Schramberg, all of Fed. Rep. of Germany

[73] Assignee: Mannesmann Aktiengesellschaft, Dusseldorf, Fed. Rep. of Germany

[21] Appl. No.: 866,032

[22] Filed: Apr. 9, 1992

[30] Foreign Application Priority Data

Apr. 9, 1991 [DE] Fed. Rep. of Germany ....... 4111886

[51] Int. Cl.[5] ........................ F16K 31/06; H01F 7/16; H01R 4/52

[52] U.S. Cl. ................................ 251/129.15; 439/11; 137/270

[58] Field of Search ............... 310/71, 89, 91; 439/11, 439/13, 18, 27; 251/129.15; 137/270

[56] References Cited

U.S. PATENT DOCUMENTS 2,712,116 6/1955 Baumann .............................. 439/18
3,971,460 7/1976 Gay-Chatain ......................... 439/13
5,173,053 12/1992 Swanson et al. ...................... 439/27

*Primary Examiner*—Arnold Rosenthal
*Attorney, Agent, or Firm*—Cohen, Pontani, Lieberman, Pavane

[57] ABSTRACT

A solenoid valve, particularly a built-in valve, having a valve housing which is provided on the end surface facing away from the installation side with means for the connection of electric lines which are outside the valve housing. The valve housing (6) is further provided with at least one electrically conductive contact track (3, 3') of the shape of a circular disc which is insulated from the valve housing and is electrically connected within the housing with the magnet (4), and a cup-shaped cover (2) can be placed over the end of the valve housing (1) having a contact track (3, 3'), the cover being provided on its inside on the bottom with at least one contacting element (5, 5') which engages under spring action with the corresponding contact track, the contacting element being electrically connected to electric lines (16) which are external to the housing.

15 Claims, 2 Drawing Sheets

SOLENOID VALVE

FIELD OF THE INVENTION

The present invention relates to a solenoid valve, in particular a built-in valve, having a valve housing which is provided, on the end surface facing away from the installation side, with means for connecting electric lines which are external to the valve housing.

BACKGROUND AND SUMMARY OF THE INVENTION

A solenoid valve of this type is known from the data sheet of the GAS Company. These so-called flush mounting valves shown there consist of a valve housing in which the magnet and a pull armature provided with valve elements are arranged. These valves can be screwed into a base plate which contains both supply and operating lines. The external arrangement of the supply and operating lines and the internal valve construction achieve the result that these valves are of very small size. For the connecting of electric connecting lines which are external to the valve housing, solder points or surfaces are arranged on the end side of the valve housing facing away from the installation side. The soldering on of the connecting lines is selected in this known valve in order to maintain the small shape of the entire valve.

This type of electric contacting is, however, difficult during installation. In the event that such valves are installed, for instance, in a valve battery, the cables which must be soldered on already before the installation of the valves interfere with the screwing in of the built-in valves. Not least of all, the danger of thereby breaking off the lines is very great. Another disadvantage is that, upon replacing a defective valve, the connecting lines have to be melted off.

Proceeding from this known prior art, the object of the invention is further to develop a solenoid valve of this type in such a manner that the electrical connection to the solenoid valve can be produced more easily, in which connection the solenoid valve as a whole should continue to be of small size.

This object is achieved in accordance with the present invention by providing a solenoid valve including valve housing with at least one electrically conductive contact track having the shape of a circular disc and which is insulated from the valve housing and electrically connected within the housing with the magnet, and a cup-shaped cover which can be pushed over the end of the valve housing provided with the contact track, said cover being provided on its bottom side with at least one contacting element which engages under spring action on the corresponding contact track and is electrically connected to electric lines outside the housing. In this way, the advantage is obtained that the electrical connection is obtained simply by placing the cover on the valve housing. The construction of the conductive contact tracks as circular discs has the advantage that, upon the corresponding arrangement of the contact elements, an electrical connection is made between connecting lines outside the housing and the lines leading to the magnet which are within the housing, the cover being turnable without eliminating the electrical connection produced between contacting element and contact track. The advantage which, in turn, results from this is that, particularly when the solenoid valve is constructed as built-in valve, twisting of the electric connecting lines is prevented upon the screwing of the valve into the base plate since the cover can turn with respect to the valve housing. As a further advantageous embodiment of the present invention, the valve housing and the cover are provided with circumferentially extending annular protruding and recessed formations which engage in complementary fashion into each other in the region in which the valve housing and the cover can be pushed on each other, said formations holding the cover on the valve housing in the direction of attachment. In this way, assurance is had in advantageously simple manner that upon the turning of the cover with respect to the valve housing, undesired loosening of the cover is prevented. As mentioned above, a further advantageous embodiment of the present invention, provides the valve housing with two concentrically arranged contact tracks having the shape of a circular disc and providing the cover correspondingly with two spring-action contacting elements. By the concentric arrangement of the contact tracks, an unambiguously associated contacting via the correspondingly arranged contact elements is provided in each position of rotation of the cover on the valve housing. In a further preferred embodiment of the present invention, the valve housing is provided on the end side bearing the contact tracks with a centrally arranged vent opening and the cover is provided at the corresponding location with a passage way for maintaining the vent opening. Thus, the venting of the valve is continued to be assured in a simple manner. In combination with this, it is of advantage that in a further embodiment of the present invention the cover is provided with an annular seal, extending concentrically to the passage way for keeping the pressure fluid away from the contact tracks and contacting elements. A depositing of oil dirt or dust which can impair the electric contact between contact track and contacting element is thus prevented. As further embodiment of the present invention, the passage way is provided with an internal thread and the cover has, in the region of the passage way on the outer end side, a hexagonally shaped outer construction for the engagement of a wrench. The internal thread arranged in the passage way thus permits the connecting of an external vent line or, for instance, the screwing in of a vent dampening. In this connection, the hexagonal construction arranged on the outer end side proves advantageous since, by means of a wrench, the cover can be held in place for the screwing of a corresponding device into the passage way. As a further advantageous embodiment of the present invention, an axially displaceable ring is arranged on the outer circumference of the cover for the clamping of the cover to the valve housing. The cover is provided with a circumferential bead on its outer circumference, and the ring on the inner surface is provided with an annularly extending correspondingly concave groove in such a manner that, when the ring is pushed onto the correspondingly shaped bead, the stop position for the clamping of the cover onto the valve housing is present. Thus, as a whole, the mechanical securing of the cover on the valve housing against axial lifting off is obtained in an advantageously simple manner. As a further embodiment, the cover is provided on the bottom side with an opening for the passage of the external electric connecting lines and the cover is provided in this region with a strain relief for the clamping of the connecting lines. In this way, the connecting lines are secured against being unintentionally pulled out. In the last advantageous embodiment of the present invention, a quenching diode is arranged within the cover, it being electrically connected to the contacting elements. This quenching diode serves to short-circuit the induction peaks produced within the valve after connection or disconnection by the inductance of the magnet coil, thus eliminating them.

BRIEF DESCRIPTION OF THE DRAWINGS

The present invention is described in further detail below with reference to the accompanying drawings in which.

DETAILED DESCRIPTION OF THE PRESENTLY PREFERRED EMBODIMENTS

Figure 1:
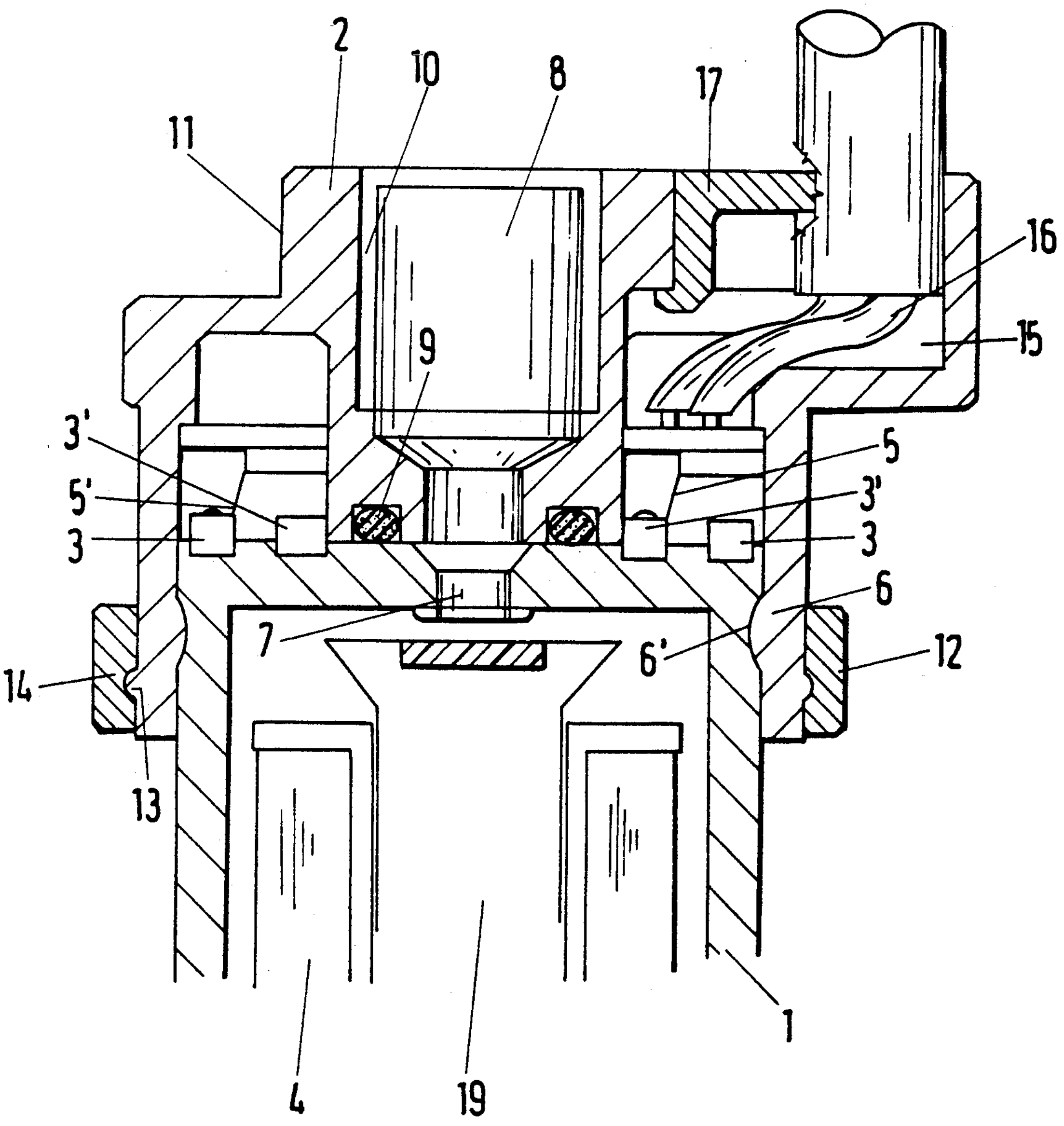
FIG. 1 is a longitudinal sectional view of the solenoid valve and cover of the present invention.

FIG. 1 shows the controlling part of the solenoid valve with its cover placed on, seen in longitudinal section. Within the valve housing 1, the magnet 4 and the displaceable valve member 19 are arranged. The cover 2 in this figure has been placed on the valve housing 1 in the functional showing. In this connection, in inward and outward formations shown as matingly engaging protrusion 6 and groove 6', of the valve housing 1 and the cover 2 engage in each other, and the ring 12 is pushed on into stop position so that the bead 13 engages in the groove 14 and thus locks the cover on the valve housing. The ring 12, which is locked in this position, presses the complementary inward and outward formations 6 and 6' of the valve housing 1 and/or the cover 2 into each other. These inward and outward formations 6, 6' extend continuously around the respective circumference of the valve housing and cover so that the ring 12 secures these inward and outward formations in controlling manner. The securing against the axial pulling of the cover 2 off from the valve housing is furthermore necessary also in order to preserve the electrical connections between cover and valve housing. Simultaneously with the securing of the cover against axial pulling off, the fact that the inward and outward formations 6, 6' extend annularly about the valve housing and cover permits the turnability of the cover 2 on the valve housing 1. For this reason, cover 2 and valve housing 1 are provided with a circular cross-sectional profile. The cover 2 is provided with electrical contacting elements 5, 5' which are developed as spring tongues. These contacting elements are connected to the connecting lines 16 within the cover. The connecting lines 16 are conducted outward through the opening 15, whereby the strain relief 17 arranged on the cover holds the connecting lines 16 in place without mechanical strain on the contacting elements. Unintended detachment of the electric connecting lines is thus prevented. The valve housing 1 is provided, on the end side facing the cover, i.e. facing away from the installation side of the solenoid valve, with two contact tracks 3, 3' arranged concentrically in the form of a circular ring. The contacting elements 5, 5' of the cover engage with the contact tracks 3, 3' each having the shape of a circular disc, thus producing an electrically conductive contact, the contacting elements being displaceable on the contact tracks by turning the cover without the electric contact being eliminated. In this connection, the contacting element 5' acts on the contact track 3' and the contacting element 5 on the contact track 3'. These contact tracks 3 and 3' are electrically connected within the housing of the solenoid valve with the magnet 4. The valve housing 1 is provided on the corresponding end surface with an opening 7 which serves as a vent. Upon displacement of the valve member 19, this vent opening is either closed or opened. Within the cover 2, there is a passage way 8 which connected to the corresponding vent opening 7. Within the cover 2 a sealing ring 9 is arranged around this passage way, thus keeping the pressure fluid which escapes through the vent opening away from the contact tracks 3, 3' or/and contacting elements 5, 5'. The passage way or opening is provided with an internal thread 10. This affords the possibility that any elements which control or influence the venting or, for instance, a waste-air hose, can be brought to and fastened in the cover. In order to achieve this turning of an external element into the thread 10 of the passage way 8, the cover 2 being in all cases turnable with respect to the valve housing 1, the hexagonally developed structural portion or part 11 is arranged on the cover so that the cover can be held in place with a wrench during the screwing of an element into the thread 10.

Figure 2:
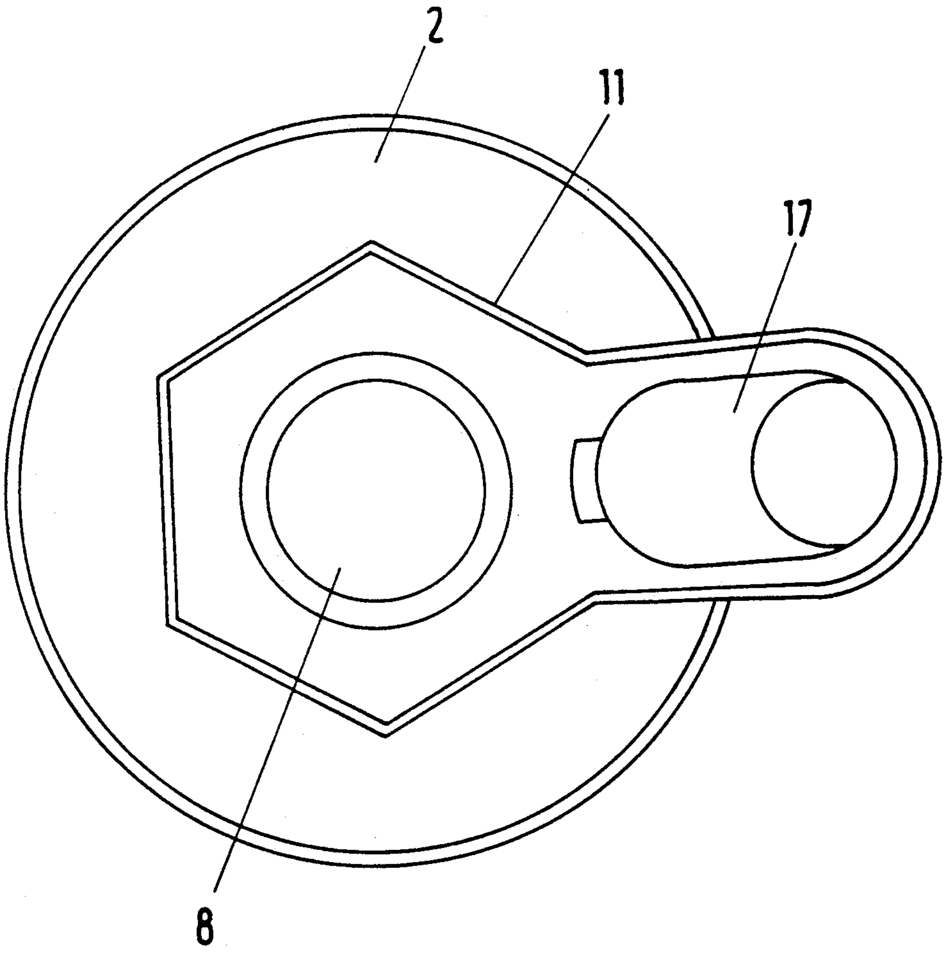
FIG. 2 is a top view of the cover.

FIG. 2 shows the cover 2 in a top view, seen from the outer end side. The round contour of the cover can be noted here. Furthermore, the passage way or opening 8 for the venting of the solenoid valve is shown. The hexagonally shaped structural portion 11 on the cover 2 can also be clearly noted. The strain relief 17 is arranged on one of the side surfaces of the hexagon, it in this way being suitably arranged directly on the cover.

It should be understood that the preferred embodiments and examples described are for illustrative purposes only and are not to be construed as limiting the scope of the present invention which is properly delineated only in the appended claims.

What is claimed is:

1. A solenoid valve having external electrical connecting lines, comprising:

a valve housing having an external surface and an interior, said valve housing having a centrally arranged vent opening extending through said external surface;

a magnet within the interior of said housing;

an electrically conductive annular contact track on said external surface, said contact track being insulated from said valve housing and electrically connected to said magnet;

a cup-shaped cover constructed for placement over said external surface of said valve housing and comprising at least one contacting element which, when said cover is in place over said external valve housing surface, engages said contact track under spring action;

said cover having a passage way therethrough in registration with said vent opening when said cover is in place over said external valve housing surface;

a valve member displaceably mounted in the interior of said valve housing for opening and closing said vent opening, such that said passage way and the interior of said valve housing are in communication when said vent opening is open; and means for electrically connecting said contacting element to said electrical lines outside said valve housing.

2. The solenoid valve of claim 1, wherein said cover is placed over said external surface in a direction, and comprising means at said cover and said valve housing for relative engagement with each other and for holding said cover in the direction of the placement of the cover over the external surface.

3. The solenoid valve of claim 1, wherein said holding means comprises a matingly engaging annular projection and annular recess.

4. The solenoid valve of claim 3, wherein said recess is disposed in said valve housing and said projection is disposed on said cover.

5. The solenoid valve of claim 3, wherein said recess is disposed in said cover and said projection is disposed in said valve housing.

6. The solenoid valve of claim 1, wherein said annular contact track is constructed as a circular disc.

7. The solenoid valve of claim 2, wherein said annular contact track is constructed as a circular disc.

8. The solenoid valve of claim 6, wherein said cover comprises two contacting elements.

9. The solenoid valve of claim 1, wherein said cover further comprises an annular seal extending concentrically about said passage way for sealing the contact tracks and/or contacting elements from pressure fluid.

10. The solenoid valve of claim 9, wherein said passage way comprises an internal thread and said cover comprises an outside surface and a hexagonal portion at said outside surface.

11. The solenoid valve of claim 1, wherein said cover and said valve housing have an axis, and further comprising a ring having a surface circumjacent said cover and displaceable in the direction of said axis for clamping said cover valve housing.

12. The solenoid valve of claim 11, additionally comprising means for clamping said ring on said cover.

13. The solenoid valve of claim 11, wherein said clamping means comprises an outwardly protruding circumferencially extending bead at said cover and a mating annular recess in said surface of said ring.

14. The solenoid valve of claim 13, wherein said cover has an opening for the passage of the external connecting lines; and a strain relief for clamping of the connecting lines.

15. The solenoid valve of claim 1, additionally comprising a quenching diode within said cover and electrically connected to said contacting element.

* * * * *